United States Patent Office.

HENRY DURELL, OF MORRISANIA, NEW YORK.

IMPROVEMENT IN CIGAR-WRAPPERS.

Specification forming part of Letters Patent No. 21,558, dated September 21, 1858.

*To all whom it may concern:*

Be it known that I, HENRY DURELL, of the town of Morrisania, in the county of Westchester and State of New York, have invented a new and useful improvement in the manufacturing from the stems and stalks or other parts of the tobacco-plant wrappers for cigars and for the other purposes for which tobacco-leaf may be applied; and I do hereby declare the following is a full and exact description of the process by which I produce or effect the same.

The object of my invention is to convert the stalks, stem, or other parts of the tobacco-plant, now comparatively useless, into an artificial leaf, which, while it shall be composed only of the same constituent parts or elements as the natural tobacoo-leaf, shall yet be more valuable and useful in its application to the various purposes to which the tobacco-leaf may be applied.

The nature of my invention consists in reducing the stalks, stems, and other parts of the tobacco-plant into small pieces by any convenient cutting machine or device, (the ordinary straw-cutter will answer,) and then macerating or steeping the same in pure water until sufficiently digested to enable me to obtain the extract or juice therefrom either by boiling or expression, which extracts or juice I preserve and inspissate to any required strength or color. I then take the stems, stalks, &c., so treated and reduce the same to the pasty or pulpy form by beating or grinding by any convenient mill or other device. (The common churn will answer on a small scale.) The pulp or pasty material so obtained is then spread on cloth or webbing of any convenient size or texture to form a leaf or sheet, and is then heavily pressed, which will produce the cohesiveness necessary to hold it in the proper form and strength requisite for the uses for which it is to be applied. It is then hung up and dried, after which it is taken down and pressed in the dry state, and subsequently immersed in the liquor or extract (previously taken from it, as above described) until it is sufficiently saturated or impregnated, so as to restore it to its original character and quality.

I have said that I obtain the soluble parts of the tobacco-plant either by boiling or expression or steeping. This operation is performed in one of the following ways: The stems and other refuse of the plant are digested in hot water for, say, two hours, or cold water three hours, when the water is drawn off and the grounds pressed in a powerful press to remove all liquid from it. The fiber is afterward ground to pulp in any known way and worked into a pulp suitable for paper. I sometimes distill the soluble part of the plant, and thus volatilize the aroma and the oil of tobacco, together with the coloring-matter. In this case the oil comes over first, and, being highly noxious, is separated and thrown away, leaving only the aroma and coloring-matter to be resupplied to the plant after it shall have been converted to paper. This makes a milder and pleasanter cigar than when the plant is only steeped in hot water, which restores the oil back to the plant material. The process in which the oil is taken away is called the boiling or distilling process, while the other is simply the steeping or infusing process.

The utility of the leaf invented by me, as above described, may be stated to consist in the saving which it will effect of time and cost of labor in stripping the ordinary tobacco-leaf; in the non-waste of materials, there being no stalks to separate; that cigars made with this wrapper will not so readily absorb moisture nor permit the flavor or aroma to escape, the texture being much closer than the natural leaf. Neither will they become brittle, but will burn evener, the thickness being equal. In addition to this, by means of my improvement cigars can be manufactured much more rapidly than now, and the time and labor of assorting the cigars by their color will be saved, as the leaf will be made of any uniform color required, and in the use of the cigar there will not be that disagreeable bitter or unpleasant taste as is now experienced with cigars made in the old way, the volatile agent of the tobacco, together with its herbaceous smell and peculiar aroma, being preserved in the juice or extract. In some instances it may be found desirable to introduce into the pulp (other than is contained in the tobacco-plant) fibrous, textile, or ligneous material for the purpose of strengthening the leaf or its use in the manufacturing inferior cigars.

I do not claim converting the fibrous or ligneous parts of the tobacco-plant into sheets or leaves; but What I do claim is—

The removal of the coloring and flavor of the plant by means described, then reducing to pulp and thence to paper the fibrous or woody parts of the plant in any known way, and then recharging said paper with the soluble or volatile matters previously removed therefrom, in order to prepare said paper to be used as wrappers for cigars.

HENRY DURELL.

Witnesses:
 A. DEGROOT,
 D. BRYAN, Jr.